Jan. 20, 1953 J. E. ECHLIN 2,626,063
SHELF PARTITION
Filed June 4, 1946 5 Sheets-Sheet 1
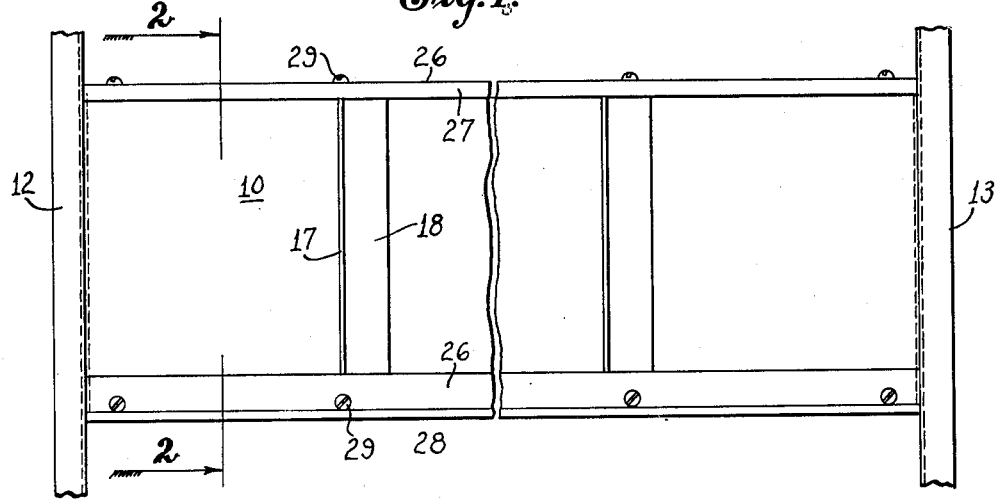
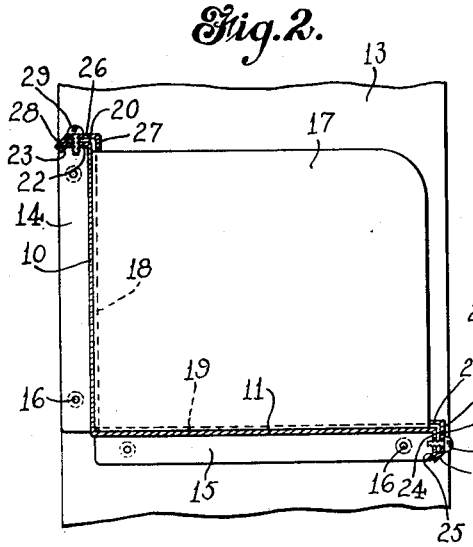
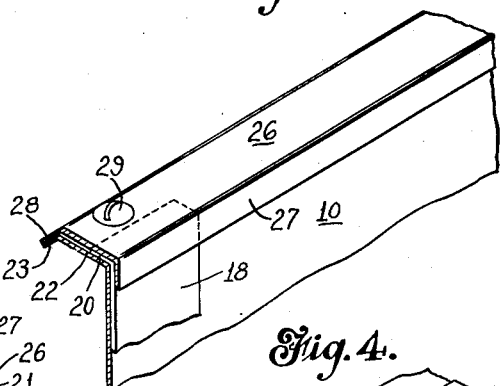
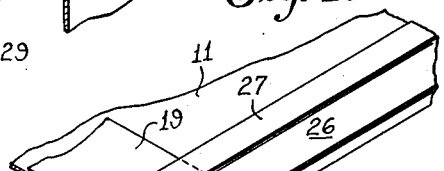
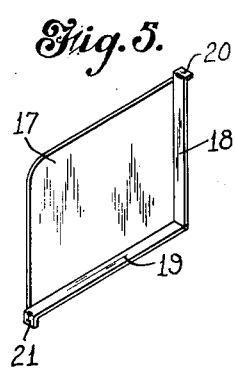
Inventor
John E. Echlin
By Rockwell Bartholow
Attorneys

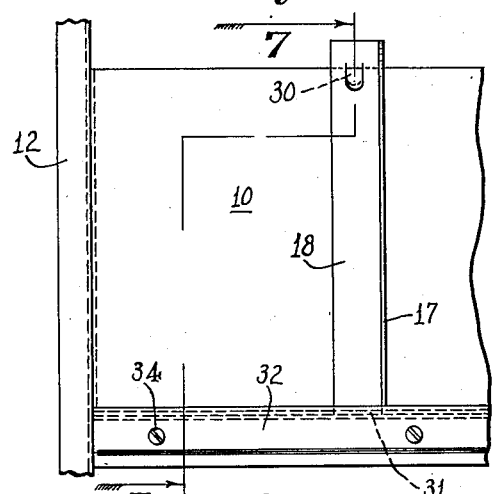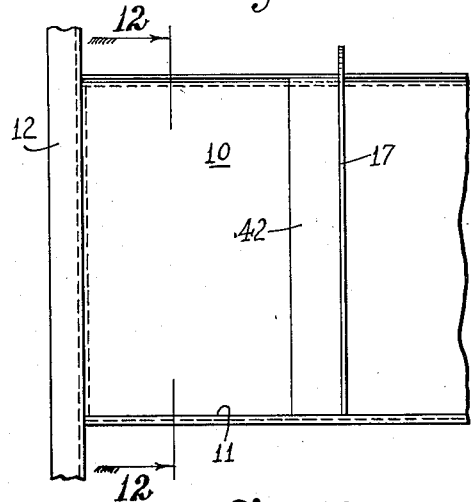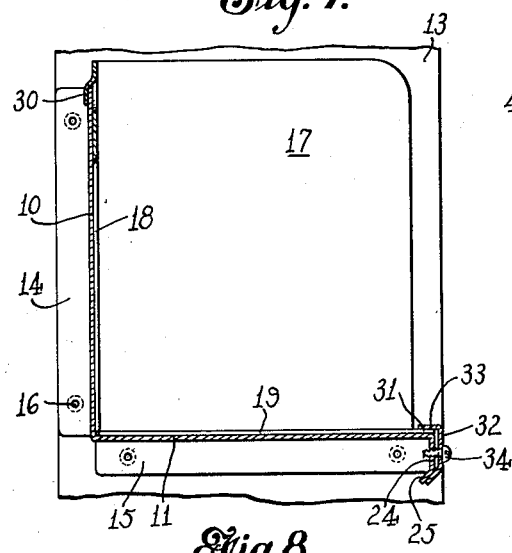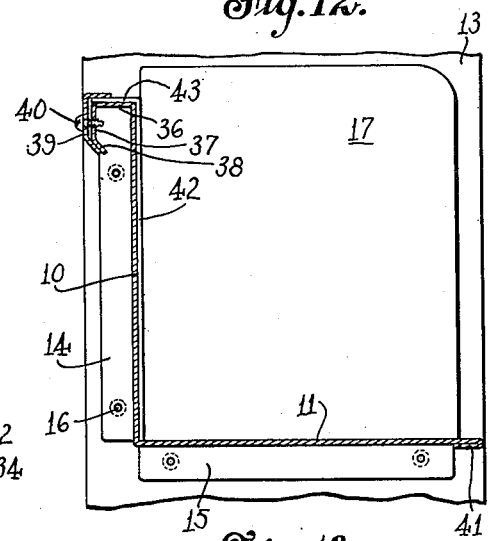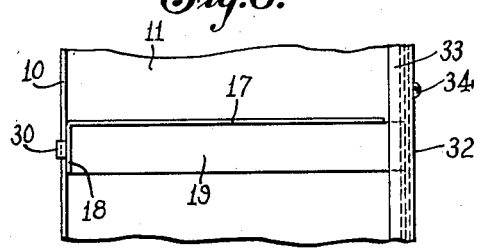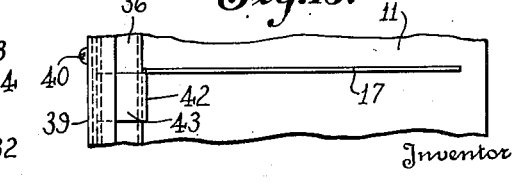

Jan. 20, 1953 J. E. ECHLIN 2,626,063
SHELF PARTITION
Filed June 4, 1946 5 Sheets-Sheet 3
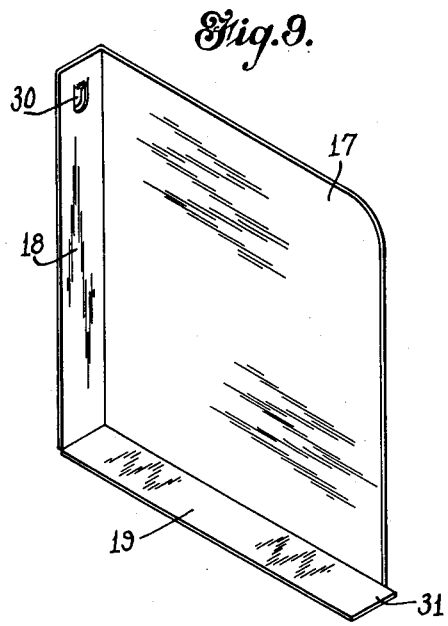
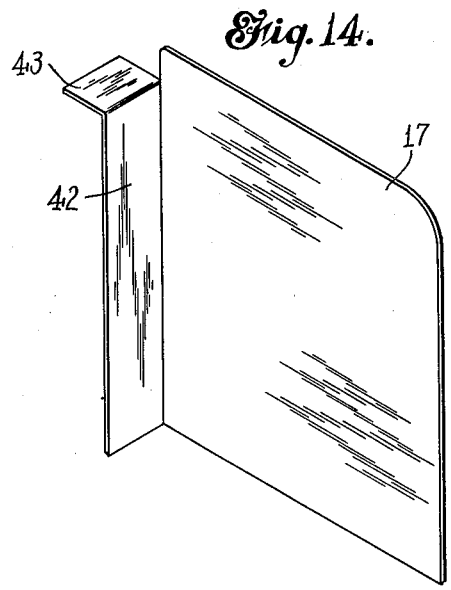
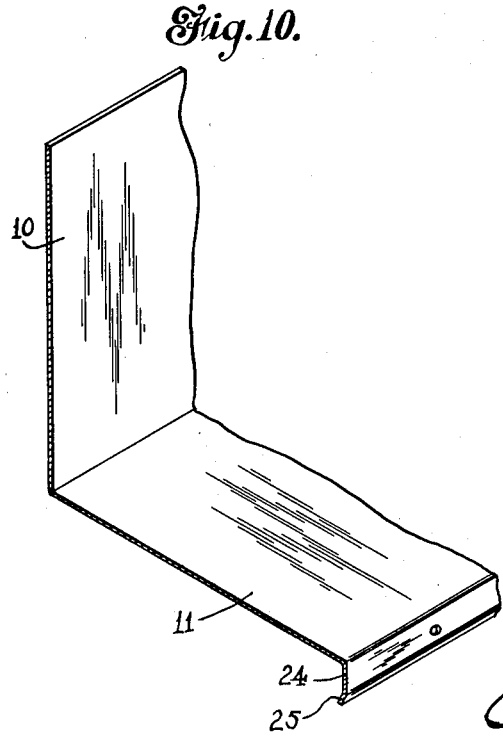
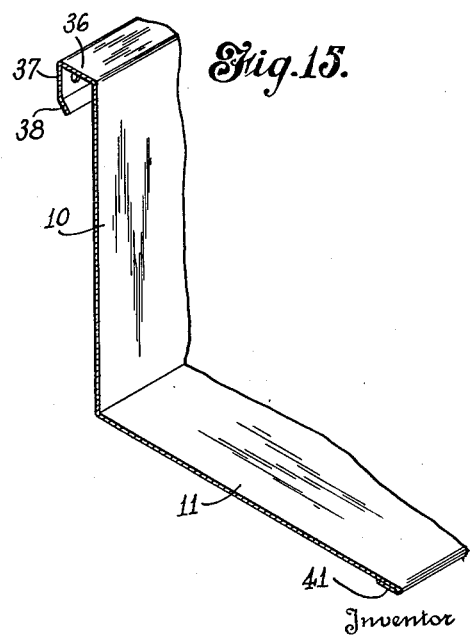
Inventor
John E. Echlin
By Rockwell Burtholow
Attorneys

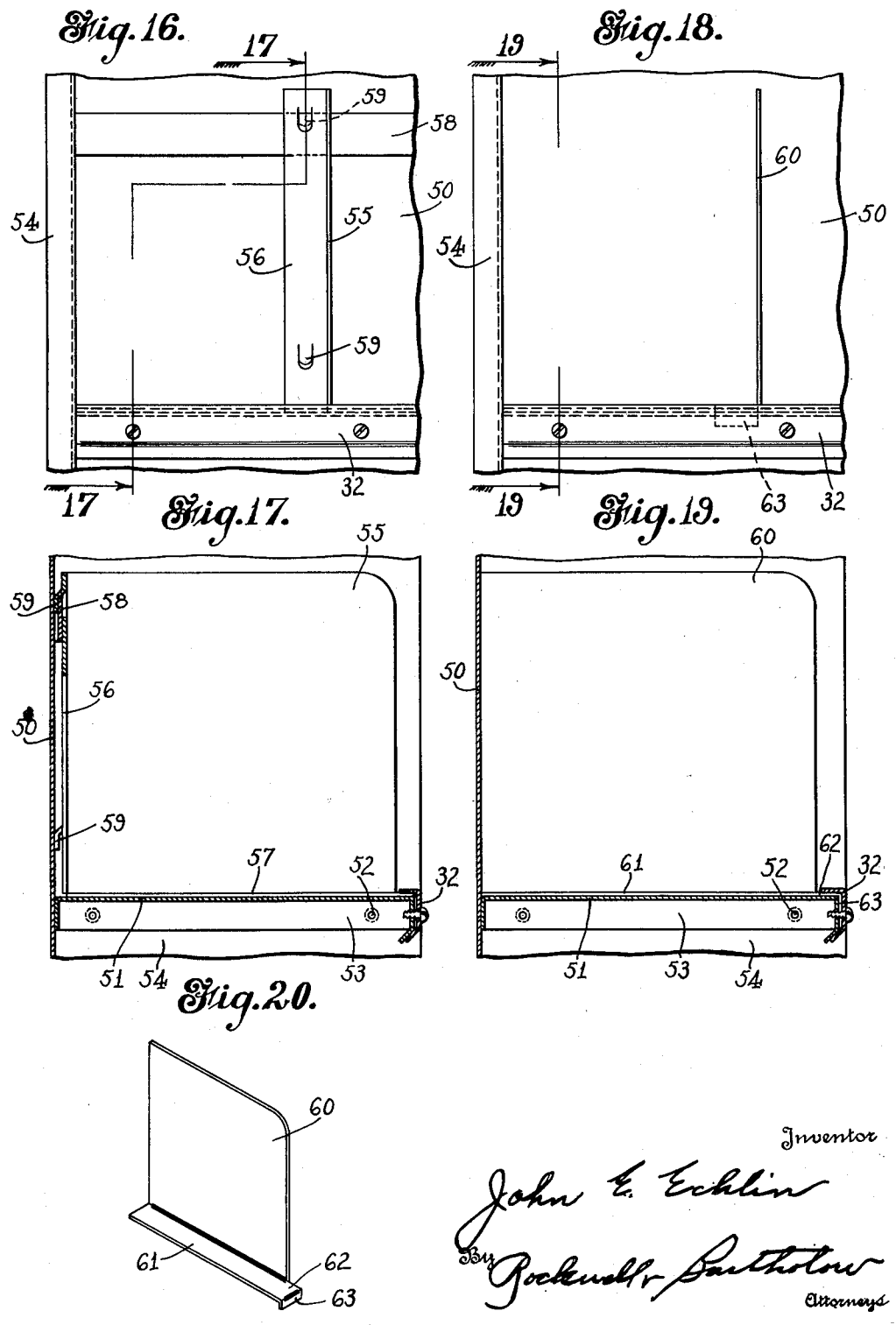

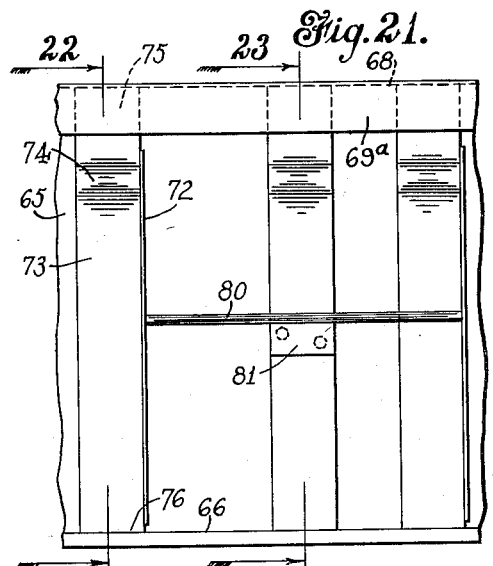
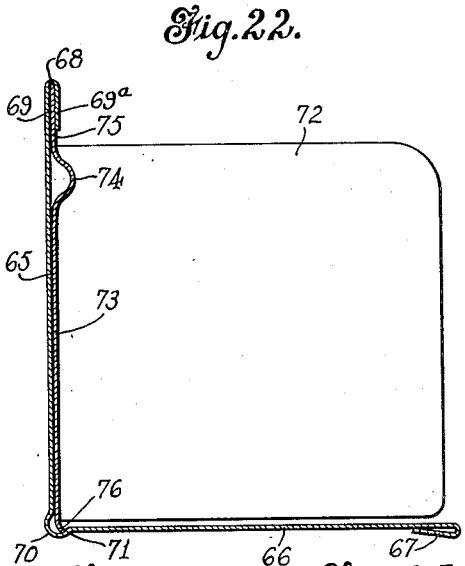
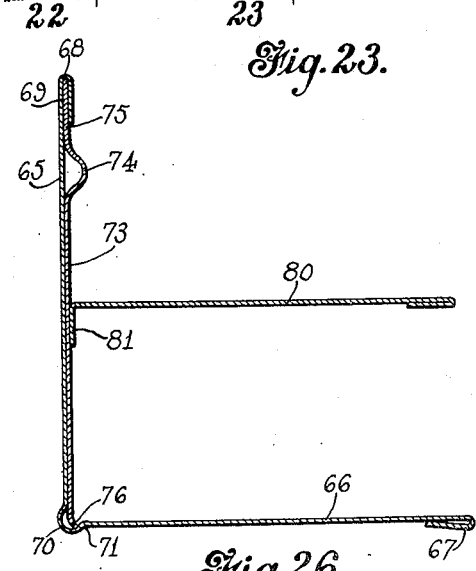
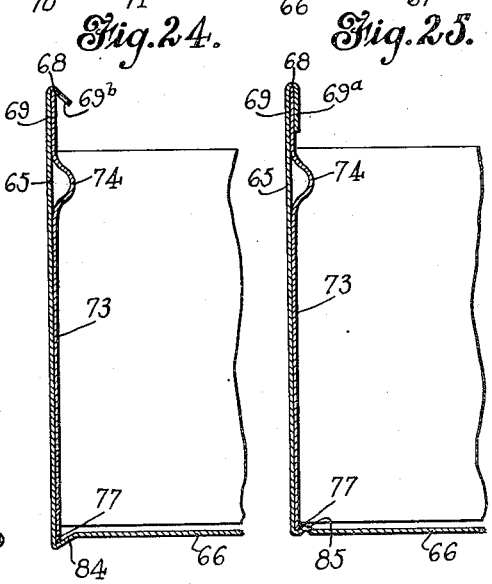
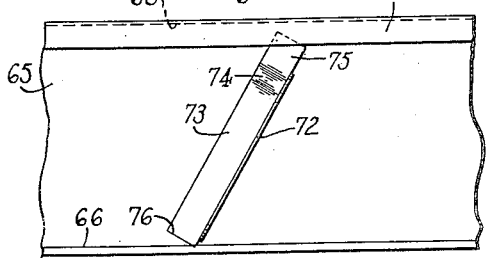

Patented Jan. 20, 1953

2,626,063

UNITED STATES PATENT OFFICE 2,626,063

SHELF PARTITION

John E. Echlin, New Haven, Conn., assignor to Beryl G. Echlin, New Haven, Conn.

Application June 4, 1946, Serial No. 674,246

2 Claims. (Cl. 211—184)

This invention relates to shelving and cooperating partitions or the like, and may comprise a multiplicity of shelves readily adapted to receiving or displaying articles of various sizes without waste of space, so that articles of any size within limits may be displayed upon the shelves conveniently and economically.

In shelving articles, and particularly packaged articles upon shelves of the usual construction, it is usually found that there is considerable waste of space in that, while the shelves may be divided into compartments by partitions, the size of the compartments is necessarily governed by predetermined spacing of holes, slots or some other means provided for the securing of the partitions into a chosen fixed position.

I contemplate by the present invention the provision of shelves or similar supporting means which will be provided with partitions arranged to be universally adjustable longitudinally of the shelves, so that they may be secured in any desired position along the shelves and not be required to be set at certain definite positions determined by spaced securing devices. As illustrated, the partitions are frictionally secured to the shelves or other supporting members and are securely held in position in that they are frictionally clamped in place, although at the same time they will be capable of a universal adjustment in that they may be clamped in any position or at any place along the shelves required by the size of the articles upon display. Moreover, the securing means is so arranged that if desired all of the partition members on one shelf may be secured in place by the same securing member, thus reducing the number of different parts necessary for the device, and also in order to move or adjust the partitions to different positions it is necessary only to loosen the securing members and it is not necessary to completely detach them.

One object of my invention is to provide a shelf structure for the display of merchandise with universally adjustable partition members.

A still further object of my invention is to provide a shelf structure of the character described which may be economically manufactured in that the partition members will be of simple form which may be easily manufactured and, at the same time, will be securely held in place by frictional means at any desired position along the shelves.

A still further object of the invention is to provide a shelf structure of the character described having partition members which may be adjustably secured in any position along the shelves with which they cooperate, these partition members consisting of a plane body portion and a flange extending substantially at right angles to the body portion and lying flatly against a portion of the shelves, and means to clamp a portion of this flange to a part of the shelf in such a manner that it will be firmly held in place and, at the same time, may be readily adjusted to a new position.

To these and other ends the invention consists in the novel features and combinations of parts to be hereinafter described and claimed.

In the accompanying drawings:

Fig. 1 is a front elevational view of a portion of a cabinet construction embodying my invention;

Fig. 2 is a sectional view on line 2—2 of Fig. 1;

Fig. 3 is an enlarged detail view showing the method of clamping the partition members in place at the upper portion of the shelf;

Fig. 4 is a similar view showing the method of clamping the partition members in place at the forward edge of the shelf;

Fig. 5 is a perspective view of one of the partition members;

Fig. 6 is a front elevational view of a portion of a cabinet showing a modified form of my invention;

Fig. 7 is a sectional view on line 7—7 of Fig. 6;

Fig. 8 is a top plan view of the partition member secured to the shelf;

Fig. 9 is a perspective view of the partition member alone;

Fig. 10 is a view of a portion of the shelf shown in Figs. 6 to 8;

Fig. 11 is a view similar to Fig. 6 showing a further modification;

Fig. 12 is a sectional view on line 12—12 of Fig. 11;

Fig. 13 is a top plan view of the partition member secured in place;

Fig. 14 is a perspective view of the partition member shown in Figs. 12 and 13;

Fig. 15 is a perspective view of a portion of the shelf shown in Figs. 11 to 13;

Fig. 16 is a front elevational view of a portion of a shelf showing a further modification;

Fig. 17 is a sectional view on line 17—17 of Fig. 16;

Fig. 18 is a view similar to Fig. 16 showing another modified form of my invention;

Fig. 19 is a sectional view on line 19—19 of Fig. 18;

Fig. 20 is a perspective view of the partition member employed in the construction shown in Figs. 18 and 19;

Fig. 21 is a front elevational view of a portion of a shelf showing further modified forms of my invention;

Fig. 22 is a sectional view on line 22—22 of Fig. 21;

Fig. 23 is a sectional view on line 23—23 of Fig. 21;

Figs. 24 and 25 are sectional views similar to Fig. 22 showing further modified forms of my invention; and Fig. 26 is a front elevational view of a portion of a shelf showing the manner of attaching the partition members illustrated in Figs. 21 to 25.

To illustrate one embodiment of my invention, I have shown in Fig. 1 of the drawings a shelf comprising a back portion 10 and a base or bottom portion 11, these parts extending substantially at right angles to each other and preferably being formed integrally of sheet material. This shelf may be secured at its ends to upright end supports 12 and 13, the portions of the shelf being provided with laterally turned flanges 14 and 15 which may be riveted or bolted to the end supports as shown at 16. It will be understood that while only one shelf is shown there may be as many shelves disposed one above the other and secured to the end supports 12 and 13 as are desired.

Frictionally secured to the shelf in any adjusted position therealong are a plurality of partition members of the form shown in Fig. 5. Each of these partition members comprises a plane body portion 17 having flanges 18 and 19 along its rear and lower edges, which flanges may be formed integrally with the body portion and which lie generally at right angles to the body portion. At the upper edge of the flange 18 is provided a rearwardly turned lip 20, and similarly a downwardly turned lip 21 is provided at the front edge of the flange 19. It may also be noted that the flange 18 extends slightly above the body portion 17 of the partition member, and likewise the flange 19 extends slightly forwardly of the partition member so that the lips 21 are respectively slightly above and forwardly of the adjacent portion of the body member 17.

By reference to Fig. 3 it will be noted that the back portion 10 of the shelf is provided with a rearwardly extending flange 22 having an inclined edge portion 23 lying at an angle to the flange 22, and at the forward edge of the bottom or base portion 11 a similar downwardly extending flange 24 is formed upon the shelf and is provided with a rearwardly inclined lip or edge 25.

Also, as shown in Figs. 3 and 4, securing members are provided to secure the partition members in place upon the shelves. These securing members are substantially alike, and each comprises a body portion 26 having a flange 27 extending at substantially right angles to the body portion and an inclined flange or lip 28 extending at an oblique angle to the body portion.

In assembling a partition member upon a shelf, the latter is placed at the desired position longitudinally of the shelf with the flange 18 lying flatwise upon the shelf portions 10 and the flange 19 lying flatwise upon the bottom or base portion 11. It will be apparent from Fig. 3, for example, that the lip 20 on the upper end of the flange 18 will lie flatly against the rearwardly extending flange 22 of the shelf and may be frictionally clamped thereupon by the body portion 26 of the securing member. The flange portion 27 of the securing member will lie in front of the flange 18, and this flange will be drawn tightly against the shelf when the securing member is tightened in place by means of screws or similar fastening members 29 by the wedging or camming action of the inclined lips 23 and 28. It will be understood that the metal of which the securing member is made will be slightly flexible and that the dimensions of the parts will be such that the edge of the lip 28 will engage the upper surface of the lip 23 before the securing member reaches its final position under pressure of the screws. Therefore, tightening of the screws will not only tend to draw the body portion 26 toward the flange 22 but will also tend to draw the flange 27 rearwardly toward the back portion 10 of the shelf so that the upper angled portion of the flange 18 will be firmly, though frictionally, secured in place.

The front edge of the flange 19 will be similarly secured in place as shown in Fig. 4, and the projection of the flanges 18 and 19 beyond the adjacent portions of the body portion 17 of the partition members will provide room for the flanges 27 to overlie the upper and forward edges of the shelf portions 10 and 11 respectively. It will be understood that the securing members 26 may, if desired, be as long as the shelves themselves so that all of the partition members mounted upon one shelf may be held in place by a single securing member at each of the upper and forward edges of the shelf. It will also be obvious that if it is desired to adjust the partition members, it is only necessary to loosen the screws 29 until the lips 20 and 21 have been freed to a sufficient extent so that they may be moved longitudinally of the shelf and that it is unnecessary to entirely remove the securing members for this purpose.

In Figs. 6 to 10, I have shown a modified form of my invention, this form, however, being fundamentally like that previously described in that there are employed the shelf portions 10 and 11 which are secured to end supporting members as before. In this case, however, the upper edge of the back portion 10 of the shelf is left plain and not provided with a rearwardly extending flange, while the base portion 11 of the shelf is provided with a downwardly extending flange 24 and an inclined lip 25 as shown in Fig. 4.

The partition member used in this form of my invention is shown in Fig. 9, and it will be noted that the flange 18 is provided with a rearwardly projecting struck-out tongue 30 which is designed to engage over the upper edge of the shelf portion 10 to hold the partition in upright position. Also, the flange 19 is not provided with a down-turned lip, as shown at 21 in Fig. 5, but extends slightly forwardly of the body portion 17 of the partition member as shown at 31. Also, as shown in Figs. 6, 7 and 8, a securing member 32 is provided at the forward edge of the shelf which is similar to the securing member shown in Fig. 4.

In this form of my invention the partition member is placed upon the shelf with the tongue 30 engaging over the upper edge of the back portions 10 of the shelf so that the latter will be embraced between this tongue and the flange 18, which flange and the flange 19 lie flatly upon the shelf portions 10 and 11 as before. Also, as shown in this figure, it will be seen that the inwardly extending flange 33 of the fastening member 32 overlies the extending end 31 of the flange 19, so that when the screw 34 is set in place the portion 31 of the flange 19 will be drawn downwardly upon the shelf portion 11 and be secured firmly in place.

In Figs. 11 to 15 of the drawings, I have shown a further modification in which the back portion 10 of the shelf is provided with a rearwardly and laterally extending flange 36, and at the end of this flange is a second downwardly extending flange 37, which flange at its lower end is provided with an inclined lip 38. To cooperate with this portion of the shelf is a securing member 39 similar to the securing members shown in Figs. 3 and 4 and similar to the securing member 32 shown in Fig. 7, this securing member being attached to the flange portion 37 by the screw 40. The shelf portion 11 is not provided in this instance with a down-turned flange, as shown in Figs. 2 and 7, but the front edge of this portion of the shelf may be turned rearwardly as at 41 to provide a selvage edge.

The partition member used in this modification is shown in Fig. 14 and comprises a body portion 17 having a laterally turned flange 42 at the rear edge thereof. As shown, there is no flange along the bottom edge of the flange 17 as there is found that none is necessary, although if desired one may be provided along this edge of the partition member. The flange 42 is provided adjacent its upper end with a rearwardly turned lip 43 formed integrally with the flange 42.

In assembling this partition member upon the shelf, as shown in Fig. 12, it will be seen that the flange 42 will lie flatly against the rear portion 10 of the shelf while the lip 43 will lie flatly upon the upper surface of the flange 36 and will be frictionally secured thereto by the fastening member 39, the lower inclined edge of which cooperates with the inclined edge 38 of the flange 37 to clamp the lip 43 in place and hold it securely against accidental movement.

In some instances shelving is constructed with a back member 50, as shown in Fig. 17, which may extend throughout the entire construction or, in any event, be common to a plurality of shelves as distinguished, for example, from the form of my invention shown in Figs. 1 and 2 wherein the back member is individual to each horizontal shelf. The shelves 51 may be secured in a position forwardly of the back member in any desired way as, for example, by rivets 52 passing through flanges 53 on the end through an upright end-supporting member 54. With such a construction I may use a partition member similar to that shown in Fig. 9, this member having a plane body portion 55 and transversely extending flanges 56 and 57. The lower flange 57 may be clamped to the front of the shelf by a clamp member 32 as previously described.

Adjacent its rear edge, the partition member may be frictionally secured in place by means of a strap or stringer 58 secured to the shelving along the rear wall 50, the flange 56 of the partition being provided with a rearwardly struck tongue 59 to engage over this strap so as to frictionally clamp the strap between the tongue and the body of the flange 56. In this way, my partition members may be used with shelving of which the back is a solid continuous wall. If desired a second tongue 59 may be provided at the lower portion of the flange 56 and a second strap 58 be provided to cooperate with this tongue.

Also, as shown in Figs. 18 to 20, I may employ with the type of shelving shown in Figs. 16 and 17 a partition member 60 shown in Fig. 20. This partition member is provided with a laterally extending flange 61 along its bottom edge, which flange is provided with a projecting end 62 and a downwardly turned lip 63. As shown in Figs. 18 and 19, this partition member may be clamped in place by means of a clamping member 32 which engages over the projecting end 62 of the flange 61 and also engages the lip 63. It will, of course, be understood that throughout the constructions shown, the fastening members 26 or 32 may be constructed in short lengths individual to each of the partitions or may be constructed in lengths to cooperate with as many partitions as is desired.

In Figs. 21 to 26 of the drawings, I have shown further forms of partition members which may be advantageously employed with shelving, particularly shelving made of sheet metal. As shown, the shelf consists of a back portion 65 and a base portion 66. The forward end of the base portion may be turned back upon itself at 67 to provide a smooth edge, while the upper edge of the back portion 65 may be turned downwardly to provide an abutment 68 and a pocket 69 between the downwardly turned portion 69ª and the back 65 of the shelf. A channel or recess 70 may be provided at the junction or angle between the back and base portions, this channel extending longitudinally of, and being depressed slightly below the level of, the base 66 in order to provide a shoulder 71.

As shown in Figs. 21 and 22, the partition member comprises a body portion 72 of substantially rectangular form and formed of sheet metal having along its rear edge a flange 73 extending laterally from the body portion at substantially right angles thereto. This flange is preferably formed integrally with the body portion of the partition, but is cut away from the body portion at the upper end thereof and provided with an outwardly bowed portion 74 above which is an upwardly extending tongue 75 which projects above the body portion 72 and extends into the pocket 69, the upper edge bearing against the abutment 68. At its lower end, the flange 73 is provided with a downwardly projecting lip 76 adapted to lie in the channel or depression 70 and engage the shoulder 71. This lip may be slightly inclined in a forward direction, so that by engagement with the shoulder 71 it will tend to urge the flange 73 tightly against the back 65 of the shelf.

The flange 73 may be made of such material as to have some resilience, so that the bowed portion 74 will permit the flange to contract and expand in length under application and release of pressure on the ends thereof. Due to this contraction the partition may be readily inserted in place upon a shelf or detached therefrom, as shown, for example, in Fig. 26. The partition may merely be inclined until the upper edge of the tongue 75 may be engaged below the portion 69ª of the back of the shelf. Then, by turning or twisting the partition to bring it into an upright position, the flange 73 will be permitted to contract to a sufficient extent to permit the partition to be turned to an upright position wherein the upper end of the flange 73 will be urged into contact with the abutment 68, and likewise the tongue 76 at the bottom of the flange will be urged into contact with the shoulder 71. This will effect a tight frictional engagement of the flange 73 with the shelf and hold the partition firmly in position. It may, of course, be readily detached by twisting it in a reverse direction until the tongue 75 is removed from the pocket 68. It will be understood that the bowed portion 74 of the flange acts as a spring tending to elongate the flange, and thus maintain both upper and lower ends in tight engagement with the shelf.

In Figs. 21 and 23 of the drawings, I have shown a further modified form of partition member in which the body portion 80 of the partition is horizontally disposed instead of being vertically disposed, as is the case with the device shown in Fig. 22. The body portion 80 may be provided with a downwardly turned portion 81 which may be secured to a flange member 73 by any convenient means, such as spot welding. The flange 73, as well as the shelf portions 65 and 66, are similar in formation to the corresponding parts shown in Fig. 22, and this partition member may be mounted and detached in the same manner. As shown in Fig. 21, the horizontal partition member 80 may divide the shelf space into two compartments, one disposed above the other instead of side-by-side compartments as is the case with the partition 72.

In Fig. 24 of the drawings, I have shown a slightly modified form of my invention wherein the channel between the back portion 65 and base portion 66 of the shelf is substantially V-shaped in form, as shown at 84. In this case, the rear wall 65 of the shelf extends vertically downward to form the rear wall of the channel, and likewise the lip 77 extends vertically downward in the same plane as the flange 73. The inclined position of the forward part of the channel 84 tends to maintain the lip 77 tightly against the back portion 65 of the shelf in the manner described above in connection with the form of my invention shown in Fig. 22. In this instance, the portion 69ᵇ is turned downwardly at an angle of substantially 45° to the horizontal.

A further modification is shown in Fig. 25 where, instead of a channel or longitudinal recess being formed at the junction of the base and back portion of the shelf, the base portion of the shelf is provided with a longitudinally extending ridge or bead 85 projecting upwardly from the plane of the shelf, this ridge or bead forming an abutment between which and the back portion 65 the lip 77 of the flange 73 is disposed. Otherwise, the parts shown in Fig. 25 are the same as described above in connection with that form of my invention shown in Fig. 22.

The lip 77 being engaged by the inclined rear face of the abutment will be urged toward the shelf and maintain the flange 73 against the back of the shelf. In all of the modifications shown in Figs. 21 to 25, the tight engagement of the relatively wide flange with the back of the shelf will hold the partition firmly in position.

While I have shown and described some preferred embodiments of my invention, it will be understood that it is not to be limited to all of the details shown, but is capable of modification and variation within the spirit of the invention and within the scope of the claims.

What I claim is:

1. A shelf structure comprising a shelf, means for supporting the shelf, said shelf comprising a back portion and a base portion disposed substantially at right angles to each other, a partition member having a plane body portion standing substantially perpendicularly to said shelf portions and having an integrally formed flange at its lower edge to lie flatly against the base portion of the shelf, said flange being extended in its own plane to provide a lip projecting outwardly from the body portion of the partition, a member secured to the base portion of the shelf and embracing the lip to clamp said lip to the base portion, and the partition member also having a flange lying against the back portion of the shelf, and said last-named flange having a downwardly projecting tongue struck therefrom to engage over the upper edge of the back portion.

2. A shelf structure comprising a shelf, means for supporting the shelf, said shelf comprising a back portion and a base portion disposed substantially at right angles to each other, a partition member having a plane body portion standing substantially perpendicularly to said shelf portions and having an integrally formed horizontally disposed flange at its lower edge and an integrally formed vertically disposed flange at its rear edge, the flanges being adapted to lie against the base and back portion of the shelves respectively, a member secured to the base portion of the shelf and embracing a portion of the horizontally extending flange to clamp this flange to the base portion, and the vertically disposed flange having a downwardly projecting tongue struck therefrom to engage over the upper edge of the back portion of the shelf.

JOHN E. ECHLIN.

REFERENCES CITED

The following references are of record in the file of this patent:

UNITED STATES PATENTS

| Number | Name | Date |
|---|---|---|
| 435,877 | Yawman | Sept. 2, 1890 |
| 575,294 | Borden | Jan. 12, 1897 |
| 578,796 | Wells | Mar. 16, 1897 |
| 607,890 | Smith | July 26, 1898 |
| 626,430 | Kearns | June 6, 1899 |
| 679,054 | Kraushaar | July 23, 1901 |
| 691,628 | Hoffman et al. | Jan. 21, 1902 |
| 903,769 | Poindexter | Nov. 10, 1908 |
| 935,560 | Stone | Sept. 28, 1909 |
| 1,046,488 | Pauley | Dec. 10, 1912 |
| 1,135,970 | Lothrop | Apr. 13, 1915 |
| 1,487,856 | Hauserman et al. | Mar. 25, 1924 |
| 1,609,355 | Holle | Dec. 7, 1926 |
| 1,736,574 | Binks | Nov. 19, 1929 |
| 1,748,339 | Gerberich | Feb. 25, 1930 |
| 1,758,307 | Bales | May 13, 1930 |
| 1,806,642 | Ohnstrand | May 26, 1931 |
| 2,056,683 | Mattman | Oct. 6, 1936 |
| 2,074,915 | Jones | Mar. 23, 1937 |
| 2,222,974 | Bow | Nov. 26, 1940 |
| 2,413,892 | Schaefer et al. | Jan. 7, 1947 |